(12) United States Patent
Ying (10) Patent No.: US 10,167,037 B2
(45) Date of Patent: Jan. 1, 2019

(54) HUMAN COMPUTER INTERACTIVE MOTION APPARATUS (71) Applicant: HANGZHOU CHIC INTELLIGENT TECHNOLOGY CO., LTD, Hangzhou (CN)

(72) Inventor: Jiawei Ying, Hangzhou (CN)

(73) Assignee: HANGZHOU CHIC INTELLIGENT TECHNOLOGY CO., LTD., Hangzhou (CN)

( * ) Notice: Subject to any disclaimer, the term of this patent is extended or adjusted under 35 U.S.C. 154(b) by 43 days.

(21) Appl. No.: 15/410,788

(22) Filed: Jan. 20, 2017

(65) Prior Publication Data

US 2018/0037290 A1     Feb. 8, 2018

Related U.S. Application Data

(63) Continuation of application No. PCT/CN2016/101609, filed on Oct. 10, 2016.

(30) Foreign Application Priority Data

| Aug. 8, 2016 | (CN) | ...................... 2016 2 0855701 U |
| Aug. 8, 2016 | (CN) | ...................... 2016 2 0856524 U |
| Aug. 16, 2016 | (CN) | .......................... 2016 1 0677638 |

(51) Int. Cl.
*B62K 11/00* (2006.01)
*B62D 51/02* (2006.01)
*B62M 7/12* (2006.01)
*B62J 99/00* (2009.01)

(52) U.S. Cl.
CPC ............ *B62K 11/007* (2016.11); *B62D 51/02* (2013.01); *B62J 99/00* (2013.01); *B62M 7/12* (2013.01)

(58) Field of Classification Search
CPC ...... B62K 11/0707; B62D 51/02; B62J 99/00; B62M 7/12
See application file for complete search history.

(56) References Cited

U.S. PATENT DOCUMENTS

| 9,499,228 B2* | 11/2016 | Chang ................... B62K 3/002 |
| 2010/0117316 A1* | 5/2010 | Weiner ............... A63C 17/0033 |
| | | 280/87.042 |
| 2013/0228385 A1* | 9/2013 | Chen ..................... B62K 3/007 |
| | | 180/6.5 |

(Continued)

FOREIGN PATENT DOCUMENTS

| CN | 205113552 | * | 3/2016 |
| CN | 104014123 A | * | 9/2016 |

*Primary Examiner* — Joseph M Rocca
*Assistant Examiner* — Marlon A Arce
(74) *Attorney, Agent, or Firm* — Hemisphere Law, PLLC; Zhigang Ma (57) ABSTRACT

A human-machine interactive motion apparatus includes a first frame and a second frame rotatable relative to each other; a rotating mechanism disposed between the first frame and the second frame to rotatably connect the first frame to the second frame; a rotation stop member fixed on at least one of the first frame and the second frame; and a function extension member rotatably connected to the rotation stop member; wherein the function extension member is connected to the rotation stop member having a limitation of a rotation angle of the function extension member relative to the at least one of the first frame and the second frame.

16 Claims, 4 Drawing Sheets

(56) References Cited

U.S. PATENT DOCUMENTS

2016/0129963 A1* 5/2016 Ying .................... B62D 51/001
                                                         180/6.5
2017/0183053 A1* 6/2017 Zeng .................... B62K 11/007

* cited by examiner

HUMAN COMPUTER INTERACTIVE MOTION APPARATUS

CROSS-REFERENCE TO RELATED APPLICATIONS

This application claims all benefits accruing under 35 U.S.C. § 119 from China Patent Application Nos. 201620855701.8, filed on Aug. 8, 2016, 201620856524.5, filed on Aug. 8, 2016, and 201610677638.8, filed on Aug. 16, 2016 in the China Intellectual Property Office, the contents of which are hereby incorporated by reference. This application is a continuation of international patent application PCT/CN2016/101609, filed Oct. 10, 2016.

FIELD

The present disclosure relates to a balance vehicle technology field, and particularly relates to a human-machine interactive motion apparatus.

BACKGROUND

A balance vehicle is also known as a somatosensory vehicle or a thinking vehicle. The operating principle thereof is mainly established on a basic principle called "dynamic stabilization", the change of vehicle posture is detected by a gyroscope and an acceleration sensor inside the vehicle body, and a motor is accurately driven by a servo control system to adjust correspondingly, in order to keep the balance of the system.

The conventional balance vehicle has two frames opposite to each other and rotatable with respect to each other. A rotation coupling between the two frames are accomplished by a rotating mechanism mounted on both of the two frames. The two frames are joined with each other to form an integral structure. The location where the two frames are joined with each other of the conventional balance vehicle is only enclosed in a shell without using other assistant member to enhance an overall functional characteristic of the balance vehicle, which limits a development and utilization of the overall structure of the balance vehicle.

SUMMARY

A human-machine interactive motion apparatus comprises a first frame and a second frame rotatable relative to each other; a rotating mechanism disposed between the first frame and the second frame to rotatably connect the first frame to the second frame; a rotation stop member fixed on at least one of the first frame and the second frame; and a function extension member rotatably connected to the rotation stop member; wherein the function extension member is connected to the rotation stop member in a stop connection manner to limit a rotation angle of the function extension member relative to the at least one of the first frame and the second frame.

In one embodiment, the rotation stop member can comprise a first rotation stop member and a second rotation stop member, the first rotation stop member can be fixed on the first frame, and the second rotation stop member can be fixed on the second frame.

In one embodiment, a first groove can be defined on the first rotation stop member, the function extension member can comprise a first stop bar disposed at a side facing the first rotation stop member, the first stop bar can be disposed in the first groove and can be rotatable in the first groove with respect to the first frame; a second groove can be defined on the second rotation stop member, the function extension member can comprise a second stop bar disposed at a side facing the second rotation stop member, the second stop bar can be disposed in the second groove and can be rotatable in the second groove with respect to the second frame.

In one embodiment, the first stop bar and the second stop bar of the function extension member can be aligned in a same line.

In one embodiment, the first groove and the second groove can be bilateral symmetrical with respect to the function extension member.

In one embodiment, the first vehicle frame can comprise a first sidewall, the second vehicle frame can comprise a second sidewall opposite to the first sidewall, the first rotation stop member can be fixed on the first sidewall, and the second rotation stop member can be fixed on the second sidewall.

In one embodiment, a maximum rotation angle of the function extension member relative to the first frame or the second frame can be less than or equal to a maximum rotation angle between the first frame and the second frame.

In one embodiment, the human-machine interactive motion apparatus can comprise a battery pack mounted to the first frame or the second frame, a battery pressing plate covered on a side of the battery pack facing the first frame or the second frame, and a battery sealing ring arranged on an interface between the battery pressing plate and the battery pack.

In one embodiment, the battery pressing plate can define a wire hole as a wire passageway for the battery pack, and can comprise a wire sealing ring fitted in the wire hole.

In one embodiment, the human-machine interactive motion apparatus can comprise a protrusion, a circuit board, and an induction switch, the circuit board can be electrically connected to the induction switch to sense whether or not the protrusion is moved.

In one embodiment, the human-machine interactive motion apparatus further can comprise a foot pad, at least one of the first frame and the second frame defines a foot placement region, the foot pad can be disposed in the foot placement region, the protrusion can be fixed on a surface of the foot pad facing the first frame or the second frame, and at least a portion of the protrusion can be inserted into the first frame or the second frame.

In one embodiment, the inductive switch can have a U-shaped opening corresponding to the protrusion, the projection can be extended into the U-shaped opening of the inductive switch in response to a user standing on the foot pad, and the projection can be retreated out from the U-shaped opening of the inductive switch in response to the user leaving the foot pad.

In one embodiment, the rotating mechanism can comprise a rotating shaft, and ends of the rotating shaft are extended out from the first frame and the second frame.

In one embodiment, the rotating mechanism can comprise snap springs, and the ends of the ends of the rotating shaft extended out are engaged with the snap springs.

In one embodiment, the rotating mechanism can comprise a stop shaft disposed between the first frame and the second frame configured to limit a maximum rotation angle between the first frame and the second frame.

In one embodiment, the rotating mechanism can comprise a stop shaft disposed between the first frame and the second frame, one end of the stop shaft can be fixed to the first rotation stop member of the first frame, another end of the stop shaft can be inserted into the second rotation stop member of the second frame, a stop groove corresponding to the stop shaft can be defined on the second rotation stop member of the second frame, and a maximum rotation angle between the first frame and the second frame can be limited through an engagement between the stop shaft and the stop groove.

In one embodiment, the stop groove can be an arc shaped structure.

The human-machine interactive motion apparatus is capable of extending the function through the function extension member in an overall structural design of the human-machine interactive motion apparatus. In particular, the function extension member can be arranged as, for example, a decoration such as a light or a vehicle status displaying screen. An armrest or a seat can be mounted on the function extension member to further expand other auxiliary functions of the human-machine interactive motion apparatus. Thereby, a full development and utilization of the overall structure of the human-machine interactive motion apparatus can be achieved to meet the needs of the user.

BRIEF DESCRIPTION OF THE DRAWINGS

Implementations are described by way of example only with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Figure 1:
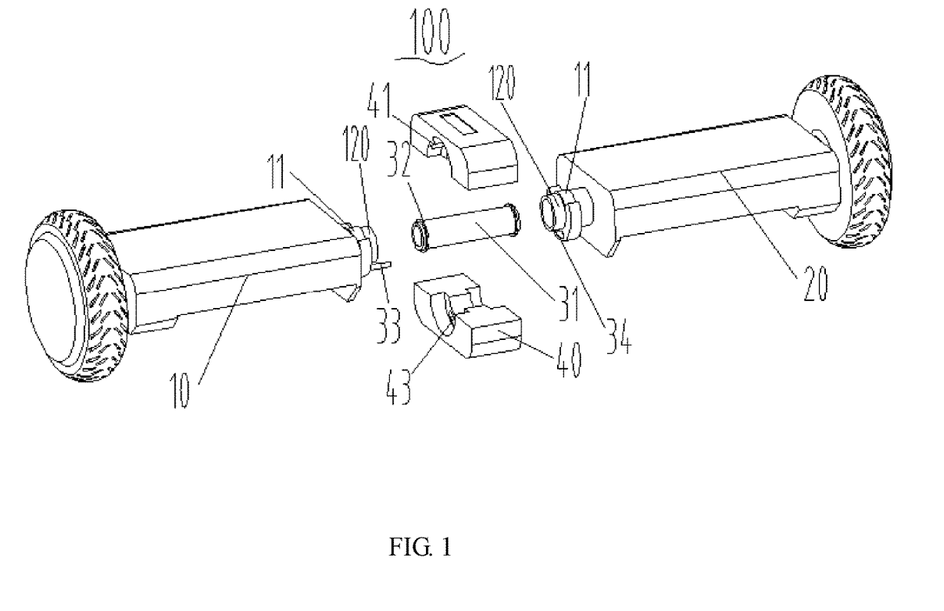
FIG. 1 is an exploded view of one preferred embodiment of a human-machine interactive motion apparatus.
Figure 2:
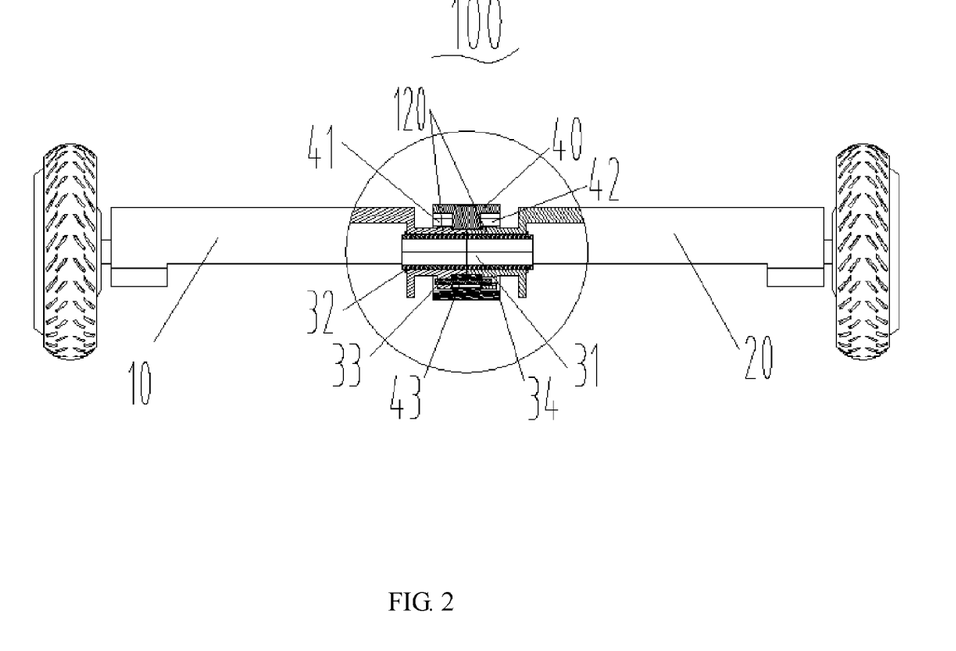
FIG. 2 is a partial cross-sectional view of one preferred embodiment of the human-machine interactive motion apparatus.

Referring to FIG. 1 and FIG. 2, an embodiment of a human-machine interactive motion apparatus 100 comprises a first vehicle frame 10 and a second vehicle frame 20 opposite to the first vehicle frame 10 and rotatably connected to the first vehicle frame 10. The first vehicle frame 10 and a second vehicle frame 20 are rotatable relative to each other. The human-machine interactive motion apparatus 100 can comprise a rotating mechanism disposed between the first vehicle frame 10 and the second vehicle frame 20 to realize a rotating connection between the first vehicle frame 10 and the second vehicle frame 20. The human-machine interactive motion apparatus 100 can further comprise a rotation stop member 120 fixed on at least one of two opposite sides of the first vehicle frame 10 and the second vehicle frame 20, and a function extension member 40 encasing-connected to the rotation stop member 120.

In one embodiment, the human-machine interactive motion apparatus 100 comprises a first rotation stop member 120 and a second rotation stop member 120, the first rotation stop member 120 is fixed on a first sidewall of the first vehicle frame 10, and the second rotation stop member 120 is fixed on a second sidewall facing the first sidewall of the second vehicle frame 20.

The first vehicle frame 10 and the second vehicle frame 20 can have substantially the same structure and shape, and the first vehicle frame 10 is rotatable relative to the second vehicle frame 20 under an action of the rotating mechanism. In one embodiment, the rotating mechanism comprises a rotating shaft 31, two opposite ends of the rotating shaft 31 are respectively extended to the first and second rotation stop members 120, and both of the first vehicle frame 10 and the second vehicle frame 20 are rotatable relative to the rotating shaft 31 to realize the rotating connection between the first vehicle frame 10 and the second vehicle frame 20. The first and second rotation stop members 120 can be coaxial with the rotating shaft 31. The first and second rotation stop members 120 can define holes corresponding to the ends of the rotating shaft 31 and configured to have the ends of the rotating shaft 31 running therethrough.

The rotating shaft 31 can be partially extended out from the first and second sidewalls of the first vehicle frame 10 and the second vehicle frame 20, and two snap springs 32 can be respectively engaged with the two opposite ends of the rotating shaft 31 extending out from the first vehicle frame 10 and the second vehicle frame 20 in a one-to-one manner. The snap springs 32 are provided in order to limit a moving of the rotating shaft 31 along a rotating axial direction thereof relative to the first and second vehicle frames 10, 20, thereby achieving a connection along the rotating axial direction between the first vehicle frame 10 and the second vehicle frame 20 in a stop connection manner, and a mutual rotation between the first vehicle frame 10 and the second vehicle frame 20.

In one embodiment, the rotating mechanism also comprises a stop shaft 33 configured to limit a maximum rotation angle between the first vehicle frame 10 and the second vehicle frame 20 as the rotating mechanism is mounted to the first vehicle frame 10 and the second vehicle frame 20. One end of the stop shaft 33 is fixed to the first rotation stop member 120 of the first vehicle frame 10, and another end of the stop shaft 33 is inserted into the second rotation stop member 120 of the second vehicle frame 20. A stop groove 34 corresponding to the stop shaft 33 is defined on the second rotation stop member 120. The stop groove 34 can limit the maximum rotation angle between the first vehicle frame 10 and the second vehicle frame 20 through an engagement between the stop shaft 33 and the stop groove 34. The stop groove 34 can be an arc shaped structure.

The function extension member 40 can be mounted on the rotation stop member 120. In one embodiment, the function extension member 40 can have the rotating shaft 31 and the combination of the first and second rotation stop members 120 running therethrough.

According to the requirements of use, the function extension member 40 can be provided as one part, or as a structure assembled from a plurality of individual parts. Through the assemblage between the function extension member 40 and the two rotation stop members 120 of the first and second vehicle frames 10, 20, the human-machine interactive motion apparatus 100 is capable of having a functional extension through the function extension member 40 in an overall structural design of the human-machine interactive motion apparatus 100. In particular, the function extension member 40 can be provided as, for example, a decoration such as an illuminating device or a vehicle status displaying device. An armrest or a seat can be mounted on the function extension member 40 to further expand other auxiliary functions of the human-machine interactive motion apparatus. Thereby, a full development and utilization of the overall structure of the human-machine interactive motion apparatus can be achieved to meet the needs of the user.

In one embodiment, the function extension member 40 is provided with a stop through hole 43 corresponding to the stop shaft 33 so that the stop shaft 33 on the first vehicle frame 10 can smoothly run through the function extension member 40 and extend into the stop groove 34 on the second vehicle frame 20, and a limitation of the maximum rotation angle between the first vehicle frame 10 and the second vehicle frame 20 can be achieved. That is, the function extension member 40 is mounted to the first and second rotation stop members 120 of the first vehicle frame 10 and the second vehicle frame 20, and does not affect the rotation angle between the first vehicle frame 10 and the second vehicle frame 20. The stop through hole 43 defined in the function extension member 40 can be opposite to the stop groove 34 of the second vehicle frame 20, and has a size equal to or larger than the stop groove 34.

The function extension member 40 can be rotatably connected to the first rotation stop member 120 of the first vehicle frame 10 in a stop connection manner. In particular, a first groove 11 can be defined on the first rotation stop member 120, and correspondingly the function extension member 40 can comprise a first stop bar 41 disposed at a side facing the first rotation stop member 120 of the first vehicle frame 10. The first stop bar 41 of the first function extension member 40 can be embedded in the first groove 11 of the first rotation stop member 120 of the first vehicle frame 10, and can be rotatable back and forth in the first groove 11 with respect to the first vehicle frame 10, when the function extension member 40 is mounted to the first vehicle frame 10.

Similarly, the function extension member 40 can be rotatably connected to the second rotation stop member 120 of the second vehicle frame 20 in a stop connection manner. In particular, a second groove 11 can be defined on the second rotation stop member 120 of the second vehicle frame 20, and the function extension member 40 can comprise a second stop bar 41 disposed at a side facing the second rotation stop member 120 of the second vehicle frame 20. The second stop bar 41 of the function extension member 40 can be embedded in the second groove 11 of the second rotation stop member 120 of the second vehicle frame 20, and can be rotatable back and forth in the second groove 21 with respect to the second vehicle frame 20 as the function extension member 40 is mounted to the second rotation stop member 120 of the second vehicle frame 20.

In one embodiment, the first stop bar 41 and the second stop bar 41 of the function extension member 40 are aligned in a same line. The first groove 11 and the second groove 11, which are respectively defined on the rotation stop members 120 of the first vehicle frame 10 and the second vehicle frame 20, are bilateral symmetrical with respect to the function extension member 40. Thereby, as the function extension member 40 is mounted to the rotation stop members 120 of the first vehicle frame 10 and the second vehicle frame 20, the function extension member 40 can rotate respectively about the first vehicle frame 10 and the second vehicle frame 20, and a maximum rotation angle of the function extension member 40 relative to the first vehicle frame 10 and the second vehicle frame 20 can be respectively limited through the first stop bar 41 and the second stop bar 42 of the function extension member 40.

A maximum rotation angle of the function extension member 40 relative to the first vehicle frame 10 and the second vehicle frame 20 can be less than a maximum rotation angle between the first vehicle frame 10 and the second vehicle frame 20 so that the function extension member 40 is capable of rotating further with the first vehicle frame 10 or the second vehicle frame 20 when the function extension member 40 rotates to the maximum rotation angle relative to the first vehicle frame 10 or the second vehicle frame 20.

Figure 3:
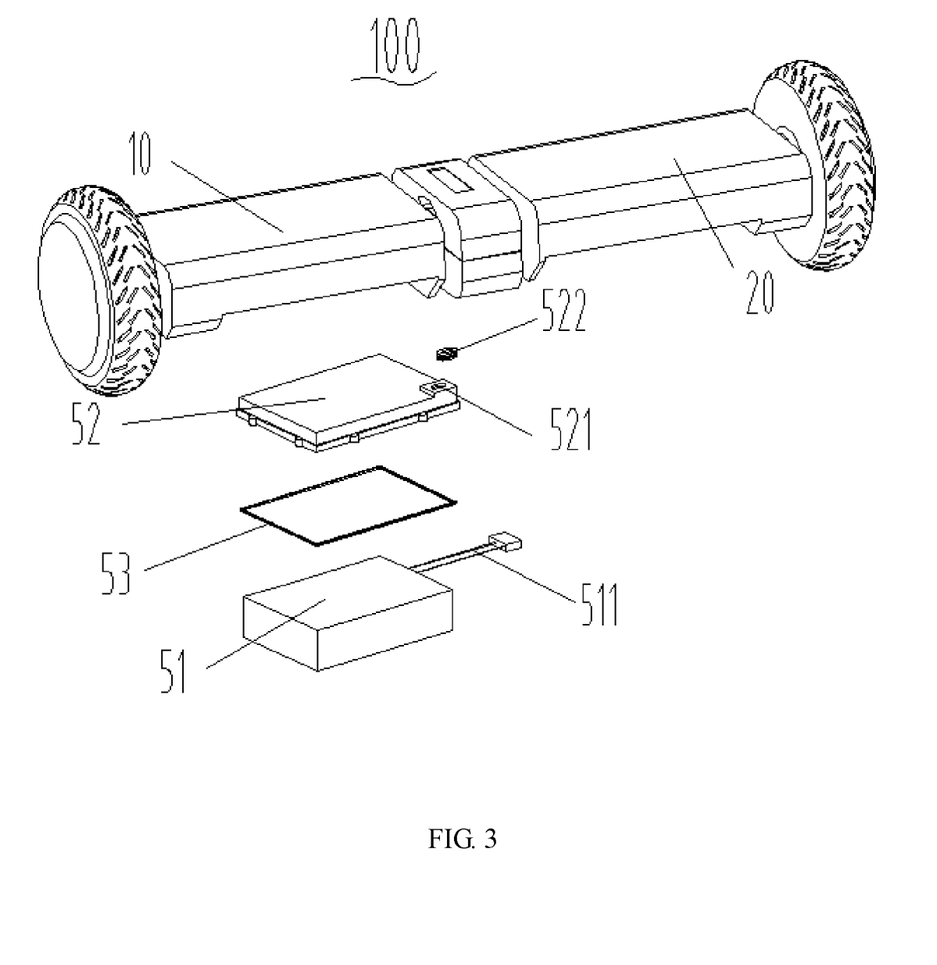
FIG. 3 is an exploded view of a one preferred embodiment of the human-machine interactive motion apparatus having a waterproof battery pack.

Referring to FIG. 3, in one embodiment, the human-machine interactive motion apparatus 100 can comprise a battery pack 51, which has a waterproof function. It can be understood that, the battery pack 51 can be mounted on the first vehicle frame 10 or the second vehicle frame 20. The human-machine interactive motion apparatus 100 can further comprise a battery pressing plate 52 covered on a side of the battery pack 52 facing the first vehicle frame 10 or the second vehicle frame 20, and a battery sealing ring 52 arranged on an interface between the battery pressing plate 52 and the battery pack 51 to achieve the waterproof function of the battery pack 51. The battery sealing ring 52 can be pressed between the battery pressing plate 52 and the battery pack 51 to realize the sealing of the vehicle frame having the battery pack 51 mounted thereto, to have the waterproof and sealing function.

When the battery pack 51 is mounted to the vehicle frame, the electrical wire 511 of the battery pack 51 has one end running through the battery pressing plate 52 thereby connecting to the electrical part on the corresponding vehicle frame, functioning as a power supply from the battery pack 51. To ensure the sealing to the battery pack 51, in the human-machine interactive motion apparatus 100 of the present embodiment, the battery pressing plate 52 has a wire hole 521 defined thereon as a passageway for the electrical wire 511 of the battery pack 51. And a wire sealing ring 522 can be fitted in the wire hole 521, so that the electrical wire 511 of the battery pack 51 is capable of extending through the wire hole 521 on the battery pressing plate 52 and being sealed by the wire sealing ring 522 to ensure the sealing effect of the battery pack 51.

The battery pack 51 can be waterproofed in the human-machine interactive motion apparatus 100, which effectively solves the waterproof problem of the battery, to avoid safety incidents such as explosion or outbreak of fire caused by water infiltration or soak in use of the human-machine interactive motion apparatus 100.

Figure 4:
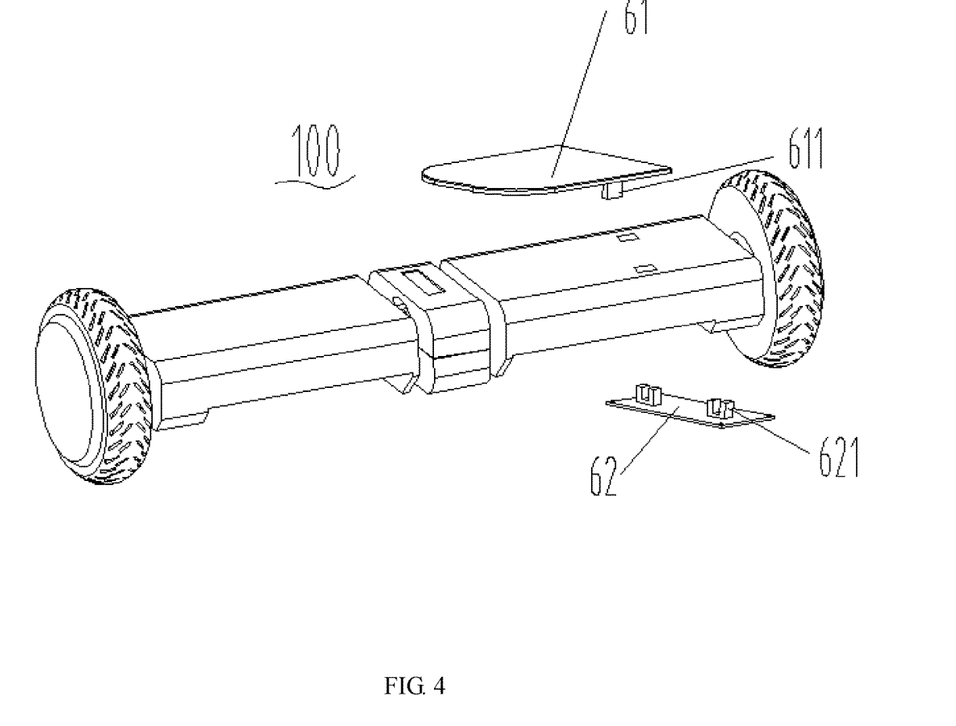
FIG. 4 is an exploded view of another preferred embodiment of the human-machine interactive motion apparatus having a simplified controlling switch.

Referring to FIG. 4, in one embodiment, the human-machine interactive motion apparatus 100 has a simplified on/off controlling switch.

The first vehicle frame 10 and the second vehicle frame 20 of the human-machine interactive motion apparatus 100 are each provided with a foot placement region for the user to stand on. A foot pad 61 is disposed in each foot placement region. The foot pad 61 is provided with a protrusion 611 fixed on a surface of the foot pad 61 facing the first vehicle frame 10 or the second vehicle frame 20, and the protrusion 611 is partially inserted into the corresponding first vehicle frame 10 or second vehicle frame 20. The protrusion 611 is used as an on/off switch for driving the human-machine interactive motion apparatus 100. Correspondingly, the human-machine interactive motion apparatus 100 comprises a circuit board 62 and an induction switch 621 mounted on each of the first vehicle frame 10 and the second vehicle frame 20, and each circuit board 62 is electrically connected to the induction switch 621 corresponding to the protrusion 611 on the foot pad 61 in an one-to-one manner to sense whether or not the protrusion 611 is moved. In the present embodiment, the induction switch 621 is a photoelectric switch.

In the present embodiment, the inductive switch 621 has a U-shaped opening corresponding to the protrusion 611 in an one-to-one manner, the protrusion 611 is extended into the U-shaped opening of the inductive switch 621 when the user stands on the foot pad 61, and the protrusion 611 is retreated out from the U-shaped opening of the inductive switch 621 when the user stands off from the foot pad 61. Through the signal transmission from the inductive switch 621, the overall opening and closing control for the human-machine interactive motion apparatus 100 can be realized.

The embodiment of the human-machine interactive motion apparatus 100 simplifies the structure of the controlling switch for operation control, which reduces the production cost of the controlling switch and, on the other hand, reduces the cost of assembling the controlling switch to the human-machine interactive motion apparatus 100, so that the production cost of the human-machine interactive motion apparatus 100 is reduced, thereby further meeting a production development of a producer.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A human-machine interactive motion apparatus comprising:
    a first frame and a second frame rotatable relative to each other;
    a rotating mechanism disposed between the first frame and the second frame to rotatably connect the first frame to the second frame;
    a rotation stop member fixed on at least one of the first frame and the second frame; and
    a function extension member rotatably connected to the rotation stop member;
    wherein the function extension member is connected to the rotation stop member in a stop connection manner to limit a rotation angle of the function extension member relative to the at least one of the first frame and the second frame;
    the rotating mechanism comprises a stop shaft disposed between the first frame and the second frame configured to limit a maximum rotation angle between the first frame and the second frame.

2. The human-machine interactive motion apparatus according to claim 1, wherein the rotation stop member comprises a first rotation stop member and a second rotation stop member, the first rotation stop member is fixed on the first frame, and the second rotation stop member is fixed on the second frame.

3. The human-machine interactive motion apparatus according to claim 2, wherein a first groove is defined on the first rotation stop member, the function extension member comprises a first stop bar disposed at a side facing the first rotation stop member, the first stop bar is disposed in the first groove and is rotatable in the first groove with respect to the first frame; a second groove is defined on the second rotation stop member, the function extension member comprises a second stop bar disposed at a side facing the second rotation stop member, the second stop bar is disposed in the second groove and is rotatable in the second groove with respect to the second frame.

4. The human-machine interactive motion apparatus according to claim 3, wherein the first stop bar and the second stop bar of the function extension member are aligned in a same line.

5. The human-machine interactive motion apparatus according to claim 4, wherein the first groove and the second groove are bilateral symmetrical with respect to the function extension member.

6. The human-machine interactive motion apparatus according to claim 2, wherein the first frame comprises a first sidewall, the second frame comprises a second sidewall opposite to the first sidewall, the first rotation stop member is fixed on the first sidewall, and the second rotation stop member is fixed on the second sidewall.

7. The human-machine interactive motion apparatus according to claim 1, wherein a maximum rotation angle of the function extension member relative to the first frame or the second frame is less than or equal to the maximum rotation angle between the first frame and the second frame.

8. The human-machine interactive motion apparatus according to claim 1, further comprising a battery pack mounted to the first frame or the second frame, a battery pressing plate covered on a side of the battery pack facing the first frame or the second frame, and a battery sealing ring arranged on an interface between the battery pressing plate and the battery pack.

9. The human-machine interactive motion apparatus according to claim 8, wherein the battery pressing plate defines a wire hole as a wire passageway for the battery pack, and comprises a wire sealing ring fitted in the wire hole.

10. The human-machine interactive motion apparatus according to claim 1, further comprising a protrusion, a circuit board, and an induction switch, wherein the circuit board is electrically connected to the induction switch to sense whether or not the protrusion is moved.

11. The human-machine interactive motion apparatus according to claim 10, further comprising a foot pad, wherein at least one of the first frame and the second frame defines a foot placement region, the foot pad is disposed in the foot placement region, the protrusion is fixed on a surface of the foot pad facing the first frame or the second frame, and at least a portion of the protrusion is inserted into the first frame or the second frame.

12. The human-machine interactive motion apparatus according to claim 11, wherein the inductive switch has a U-shaped opening corresponding to the protrusion, the projection is extended into the U-shaped opening of the inductive switch in response to a user standing on the foot pad, and the projection is retreated out from the U-shaped opening of the inductive switch in response to the user leaving the foot pad.

13. The human-machine interactive motion apparatus according to claim 1, wherein the rotating mechanism comprises a rotating shaft, and ends of the rotating shaft are extended out from the first frame and the second frame.

14. The human-machine interactive motion apparatus according to claim 13, wherein the rotating mechanism further comprises snap springs, and the ends of the ends of the rotating shaft extended out are engaged with the snap springs.

15. The human-machine interactive motion apparatus according to claim 2, wherein one end of the stop shaft is fixed to the first rotation stop member of the first frame, another end of the stop shaft is inserted into the second rotation stop member of the second frame, a stop groove corresponding to the stop shaft is defined on the second rotation stop member of the second frame, and the maximum rotation angle between the first frame and the second frame is limited through an engagement between the stop shaft and the stop groove.

16. The human-machine interactive motion apparatus according to claim 15, wherein the stop groove is an arc shaped structure.

\* \* \* \* \*